United States Patent

Iwasaki

Patent Number: 5,881,030
Date of Patent: Mar. 9, 1999

[54] DOWNSIZED MAGNETO-OPTICAL DISK DRIVE DEVICE

[75] Inventor: Masaaki Iwasaki, Kawasaki, Japan

[73] Assignee: Fujitsu Limited, Kawasaki, Japan

[21] Appl. No.: 897,489

[22] Filed: Jul. 21, 1997

[30] Foreign Application Priority Data

Jan. 28, 1997 [JP] Japan ................................ 9-013708

[51] Int. Cl.$^6$ .................................................. G11B 11/00
[52] U.S. Cl. .............................................. 369/13; 369/75.2
[58] Field of Search .............................. 369/13, 14, 75.1, 369/75.2, 77.1, 77.2, 76, 110; 360/59, 114

[56] References Cited

U.S. PATENT DOCUMENTS

| 5,327,417 | 7/1994 | Tanaka et al. | 369/13 |
| 5,329,503 | 7/1994 | Ohmori et al. | 369/13 |
| 5,392,273 | 2/1995 | Masaki et al. | 369/106 |
| 5,513,166 | 4/1996 | Tokumitsu et al. | 369/116 |

FOREIGN PATENT DOCUMENTS 7093889  4/1995  Japan .

Primary Examiner—Tan Dinh
Attorney, Agent, or Firm—Greer, Burns & Crain, Ltd.

[57] ABSTRACT

An optical disk apparatus is downsized. The optical disk apparatus comprises an optical disk drive mechanism having a rotating mechanism for rotating an optical disk and an optical head for optically reading data on the optical disk, and a circuit board. An analog circuit and a digital circuit are mounted upon a single surface on one side of the circuit board of the optical disk drive mechanism. This analog circuit includes a drive circuit for driving the optical head, and a read circuit for creating read data from detection signals of the optical head. The digital circuit includes a one chip LSI circuit having a processor for executing the main control, a memory connected to an internal address/data bus and used for processing of the processor, a logic circuit connected to the internal address/data bus for creating a timing gate for transmitting and receiving the data to and from the optical head, and a controller connected to the internal address/data bus and for performing interface control with a host apparatus.

15 Claims, 10 Drawing Sheets

DOWNSIZED MAGNETO-OPTICAL DISK DRIVE DEVICE

BACKGROUND OF THE INVENTION

1. Field of the Invention

The present invention relates generally to an optical disk apparatus including an optical disk drive mechanism and a circuit board mounted with a control circuit and, more particularly, to an optical disk apparatus constructed to decrease a thickness of the apparatus.

2. Description of the Related Art

An optical disk apparatus has been utilized as a storage apparatus in a computer system. Such an optical disk apparatus has been required to increase in storage capacity and to be downsized. For example, it has been required that the optical disk apparatus be incorporated into a lap-top type computer.

FIG. 6 is a view showing a construction in the prior art. FIG. 7 is a block diagram showing a circuit in the prior art. FIGS. 6 and 7 exemplify a magneto-optic disk apparatus by way of an optical disk apparatus.

As illustrated in FIG. 6, a control circuit of the magneto-optic disk apparatus is constructed as follows. To be specific, a microprocessor (MPU) 61 executes main control of the apparatus. A random access memory (RAM) 65 is a memory used for processing of the MPU 61.

A read-only memory (ROM) 66 is a memory for storing the control program executed by the MPU 61. An optical disk controller (ODC) 63 carries out the interface control with a host apparatus, and also encodes/decodes the data. A random access memory (RAM) 67 is used as a buffer memory for read/write data.

A digital signal processor (DSP) 64 effects servo control of the optical head of the optical disk drive mechanism. A control logic circuit 62 is a group of logic circuits for transmitting and receiving digital signals to and from the optical head of the optical disk drive mechanism. The control logic circuit 62 creates a timing gate signal for transmitting and receiving the data between the optical head and the processor 61.

Such digital circuits 61, 65, 63, 64, 66 are connected via a common address/data bus 68. Analog circuits are provided in addition to these digital circuits. The analog circuits consist of a read circuit 69, a write circuit 71, a drive circuit 72 and a signal amplifier circuit 75.

The read circuit 69 amplifies an output of an optical detector 90 of the optical head and thereafter generates data pulses. The thus generated pulses are outputted as read data to a controller 63. The write circuit 71 pulse-drives a laser diode 91 of the optical head with a predetermined power in accordance with the write data. The data are thereby written onto the optical disk.

The drive circuit 72 drives the drive mechanism 92 of the optical head in accordance with a servo signal given from the DSP 64. The drive mechanism 92 of the optical head may include a focus actuator of the optical head, a track actuator of the optical head, and a moving motor of the optical head.

A servo AGC circuit 81 creates a focus error signal and a track error signal from detection outputs of the optical detector 90 within the optical head, and outputs them to the DSP 64.

An explanation will be given with reference to a circuit block diagram of FIG. 7.

As illustrated in FIG. 7, the MPU 61 and the control logic circuit 62 are formed on one chip. Then, a clock source 73 is connected to this one-chip LSI. The RAM 67 and a terminal resistor 74 of a host interface are connected to the optical disk controller 63. The RAM 65 and the ROM 66 are connected to the MPU 61 via the address/data bus 68.

The optical head 80 is provided with a write LSI circuit 71 and a pre-amplifier servo AGC circuit 81. The write LSI circuit 71 performs read/write light emission control of the laser diode (light emitting element) 91. The write LSI circuit 71 is connected to the control logic circuit 62, and performs read/write light emission control of the laser diode 91 in accordance with an indication from the MPU 61.

After converting a detection current of the optical detector 90 of the optical head 80 into a voltage, the pre-amplifier servo AGC circuit 81 generates a regenerative signal, a focus error signal and a track error signal. The focus/track error signals are outputted to the DSP 64.

The read circuit (LSI) 69 generates a data pulse from of the regenerative signal of the pre-amplifier servo AGC circuit 81, and outputs the pulsed read data to the optical disk controller 63. Note that an analog switch 69-1 and an inverting circuit 69-2 are provided for the read circuit 69.

The analog LSI circuit 75 is constructed by integrating analog circuits such as an operational amplifier and a comparator that are used within the apparatus. The analog LSI circuit 75 filters and amplifies the focus/track error signals.

An amplifier 76 is an operational amplifier for analog filtering. The amplifier 76 filters an output of the pre-amplifier servo AGC circuit 81. An amplifier 77 is an operational amplifier for analog filtering and further filters the output from the analog LSI circuit 75.

A mechanism 82 of the optical disk drive is provided with a lens position detecting circuit 93 for detecting a lens position of the optical head 80. An AGC amplifier 70 is a circuit for effecting a current/voltage conversion of a sensor signal of the detecting circuit 93.

Further, the mechanism 82 of the optical disk drive is provided with a focus actuator 92-1, a track actuator 92-2 and a voice coil motor 92-3 as drive mechanisms of the optical head 80.

The focus actuator 92-1 drives the lens of the optical head 80 in a focusing direction, thereby adjusting a focus position of light beams. The track actuator 92-2 drives the lens of the optical head 80 in a track traversing direction, thereby adjusting a track position of the light beams. The voice coil motor 92-3 moves the optical head 80 in the track traversing direction on the optical disk.

The DSP 64 executes a variety of servo control processes in response to the focus/track error signals transmitted from the analog LSI circuit 75, and the lens position detecting signal from the AGC amplifier 70. That is to say, the DSP 64 performs focus servo control, track servo control and seek control as well.

The DSP 64 has a group of A/D converters for executing analog-to-digital conversions of the focus/track error signals and the lens position detecting signal. Then, the DSP 64 calculates servo control values (a focus servo control value, a track servo control value and a seek servo control value) on the basis of these A/D converted signals.

The DSP 64 has a group of D/A converters for converting the various servo control values into analog servo control values. A drive circuit 72 for the servo control and the seek control is connected to the DSP 64.

This drive circuit 72 is constructed of a focus driver circuit 72-1 for driving the focus actuator 92-1 in accordance with a focus servo control quantity, a track driver circuit 72-2 for driving the track actuator 92-2 in accordance with a track servo control quantity, and a VCM driver circuit 72-3 for driving a voice coil motor 92-3 in accordance with a seek servo control quantity.

Further, the mechanism 82 is provided with an eject motor 93-1 for ejecting the optical disk cartridge out, and a spindle motor 93-2 for rotating the optical disk.

The eject driver circuit 78-1 drives the eject motor 93-1 in accordance with an indication of the MPU 61 via the control logic circuit 62. The spindle driver circuit 78-2 drives a spindle motor 93-2 in accordance with an indication of the MPU 61 through the control logic circuit 62.

Provided further is a bias magnetic field coil 94 for applying a magnetic field across the optical disk. The bias driver circuit 79 drives the bias magnetic field coil 94 in accordance with an indication of the MPU 61 via the control logic circuit 62. The bias magnetic field coil 94, through which predetermined currents in positive and negative directions flow, thereby generates the magnetic fields of positive and negative polarities.

An amplifier 79-1 is an operational amplifier for detecting the bias drive current. A comparator 79-2 is a comparator for setting a bias drive current value.

A dip switch 75 is a switch for setting addresses from outside. A flip-flop 76 holds set values of the dip switch 75. The dip switch 75 and the flip-flop 76 are provided for an SCSI interface.

FIGS. 8 and 9 are diagrams (part 1, and part 2) showing a construction in the prior art. FIG. 10 is a diagram illustrating a construction in the prior art.

FIG. 8 is the diagram of a circuit board 86 as viewed from above. FIG. 9 is the diagram of the circuit board 86 as viewed from under. According to the prior art, as illustrated in FIG. 8, respective ICs and LSIs are mounted on the upper surface of the single circuit board 86. Then, remaining ICs and LSIs 65, 66, 67-2 are mounted on the lower surface of the circuit board 86 is, as illustrated in FIG. 9. Incidentally, 84-1 to 84-5 in FIGS. 8 and 9 designate connectors for connections to the optical disk drive mechanism. Additionally, the numeral 85 represents an interface connector consisting of an SCSI interface connector.

Referring to FIG. 9, areas 87, 88, 89 defined by dotted lines on the circuit board 86 are classified as wiring areas for an address/data bus, etc. The areas elevated by the bias coils of the optical disk drive mechanisms 80, 82 do not have a height enough to mount the parts. Parts can not be mounted on these areas and these areas are therefore provided with the address/data bus.

As shown in FIG. 10, the circuit board 86 is fixed onto the optical disk drive mechanism 82 with screws. The circuit board 86 is fixed to the optical disk drive mechanism 82 so that its lower surface, upon which is mounted a comparatively small number of parts, faces to the optical disk drive mechanism 82.

In recent years, there has been demanded an expansion of a field where the optical disk apparatus is utilized. The optical disk apparatus is required to be used as a substitute for, e.g., a floppy disk apparatus of a lap-top type computer. The lap-top type computer has a slot for a 3.5 inch. floppy disk apparatus that is approximately 17 mm thick, 102 mm wide and 140 mm deep.

Accordingly, it is required that the optical disk apparatus be constructed of a size small enough to enter this slot in order to incorporate the optical disk apparatus into the lap-top type computer.

There arises, however, a problem inherent in the prior art, wherein both surfaces of the circuit board 86 are mounted with the parts such as ICs in the prior art, and hence the optical disk apparatus can not be reduced in thickness.

Further, the control circuit of the optical disk apparatus has a multiplicity of digital LSIs connected to a common bus. Then, these components are connected to each other via the common bus, and therefore the bus on the circuit board needs to be made relatively long. The common bus can not be normally arranged at random, but is required to be arranged in parallel. Therefore, the bus on the circuit board is a large obstacle against the layout of the parts. Another problem is that it is difficult to mount a one-sided surface of a small circuit board with the parts.

Furthermore, a multiplicity of analog circuits exist in the control circuits of the optical disk apparatus. Those analog circuits are not so resistant to outside noises. On the other hand, since the digital circuit makes high-frequency signals run through the common bus, the noises are caused from the bus. There must be a problem in which those noises exert adverse influences on the analog circuits mounted on the circuit board.

Besides, the circuit board is required to be mounted with the multiplicity of ICs, and this mounting is time-consuming. Moreover, both surface of the circuit board are mounting with and parts, and therefore are required to be reflow-soldered. This results in such a problem that the manufacturing costs increase.

SUMMARY OF THE INVENTION

It is a primary object of the present invention to provide a downsized optical disk apparatus that is small in thickness, width and depth.

It is another object of the present invention to provide an optical disk apparatus constructed to reduce the thickness of the apparatus by packaging only a one-sided surface of a circuit board with parts.

It is still another object of the present invention to provide an optical disk apparatus capable of down-sizing the circuit board itself by decreasing a distance of a common bus extending over the circuit board, and of packaging the one-sided surface of the circuit board with the parts.

It is a further object of the present invention to provide an optical disk apparatus capable of preventing analog circuits from being radiated with noises by decreasing the distance of the common bus extending over the circuit board.

To accomplish the above objects, an optical disk apparatus comprises an optical disk drive mechanism having a rotating mechanism for rotating an optical disk, and an optical head for reading data on the optical disk by irradiating the optical disk with light beams. The optical disk apparatus also comprises an analog circuit for processing signals of the optical head, a digital circuit for controlling the analog circuit, and a circuit board mounted on the optical disk drive mechanism. The analog circuit and the digital circuit are mounted on a single surface, on the side of the optical disk drive mechanism, of the circuit board.

Then, the analog circuit includes a drive circuit for driving the optical head, and a read circuit for creating read data from detection signals of the optical head. The digital circuit includes a one-chip LSI circuit having a processor for executing main control, a memory connected to an internal address/data bus and used for processing of the processor, a logic circuit for generating a timing gate for the processor transmitting and receiving the data to and from the optical head, and a controller, connected to the internal address/data bus, for performing interface control with a host apparatus.

According to the present invention, first, all the parts are mounted only on a one-sided surface of the circuit board, and it is therefore possible to reduce the thickness of the circuit board mounted with the parts. This makes it feasible to decrease the thickness of the optical disk apparatus with this circuit board mounted in the optical disk drive.

Second, since all the parts are mounted only on a one-sided surface of the circuit board, a technical emphasis is put on the bus. Normally, the bus can not be connected at random and is required to be arranged in parallel. This being the case, if there are a good number of LSIs connected to the bus, and if the parts are disposed away from each other, a long line of bus is needed. This long bus becomes an obstacle against a layout of the parts on the circuit board. It is therefore impossible to dispose the parts only on a one-sided surface of the circuit board in the prior art.

Then, according to the present invention, a one-chip LSI accommodates digital circuits connected to the common bus as much as possible, and the bus is taken in the LSI. With this arrangement, a length of the bus on the circuit board is decreased, and a degree of freedom of packaging the parts increases. All the parts can be mounted on only on a one-sided surface of the circuit board.

Further, one LSI accommodates a variety of digital circuits, and hence a mounting area of these circuits is also decreased. Therefore, it is feasible to down-size the circuit board itself, and to easily mount only a one-sided surface of the circuit board with the parts.

Moreover, the great majority of digital circuits where the noises emerging from the bus are circuits with digital signals inputted and outputted. Under such circumstances, at least a processor, a memory, a logic circuit and a controller with the digital signals inputted and outputted, are integrally formed. Since the digital circuits are united, the external analog circuits can be prevented from being radiated with the noises. Hence, servo control and data reading operation can be accurately carried out.

Besides, all the parts are mounted on only a one-sided surface of the circuit board, and hence labor for mounting the parts is reduced. In addition, soldering to only a one-sided surface suffices, and the manufacturing costs can be thereby remarkably decreased.

Other features and advantages of the present invention will become readily apparent from the following description taken in conjunction with the accompanying drawings.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principle of the invention, in which.

DETAILED DESCRIPTION OF THE PREFERRED EMBODIMENTS

Figure 1:
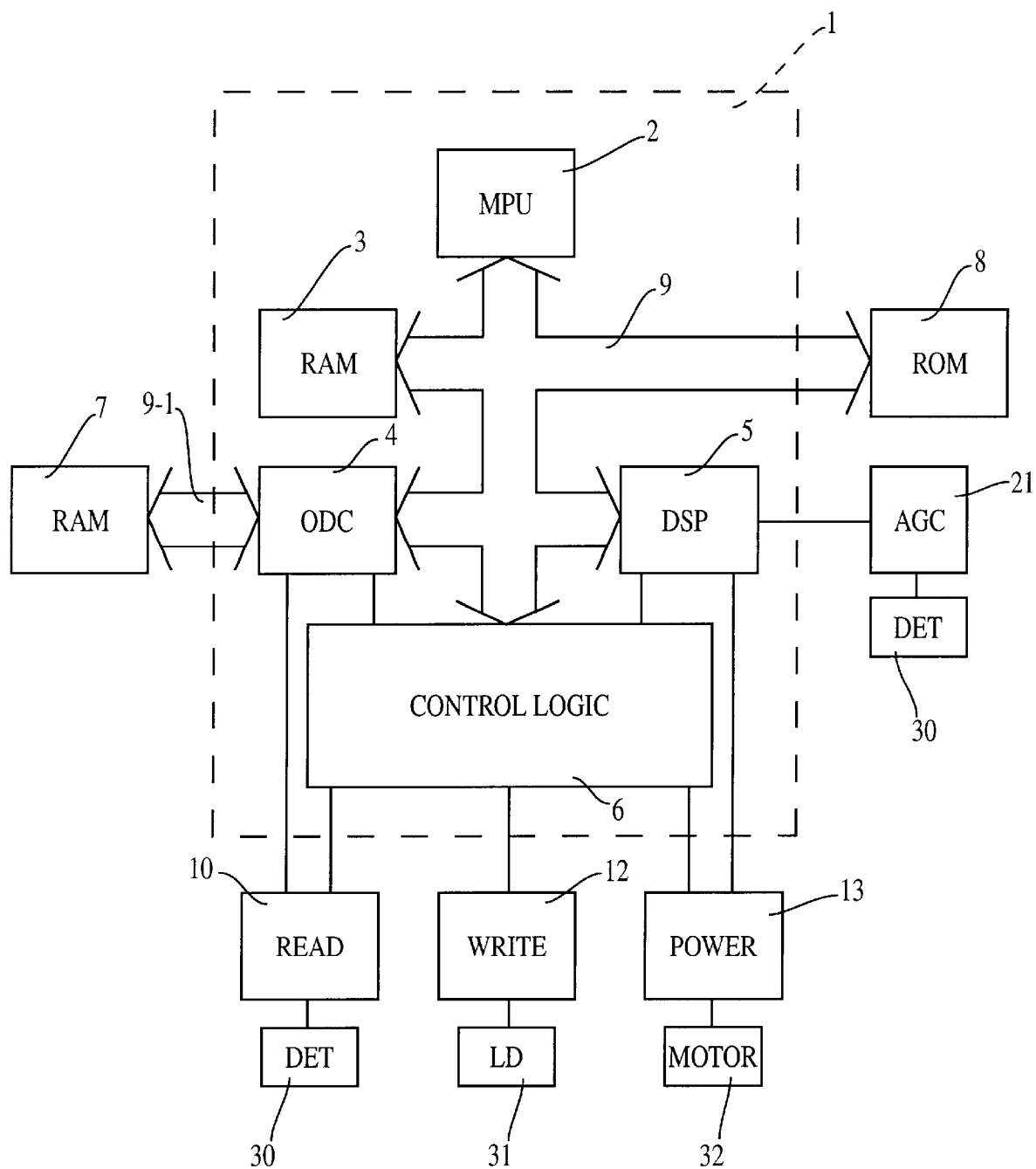
FIG. 1 is a diagram showing a construction in one embodiment of the present invention.
Figure 2:
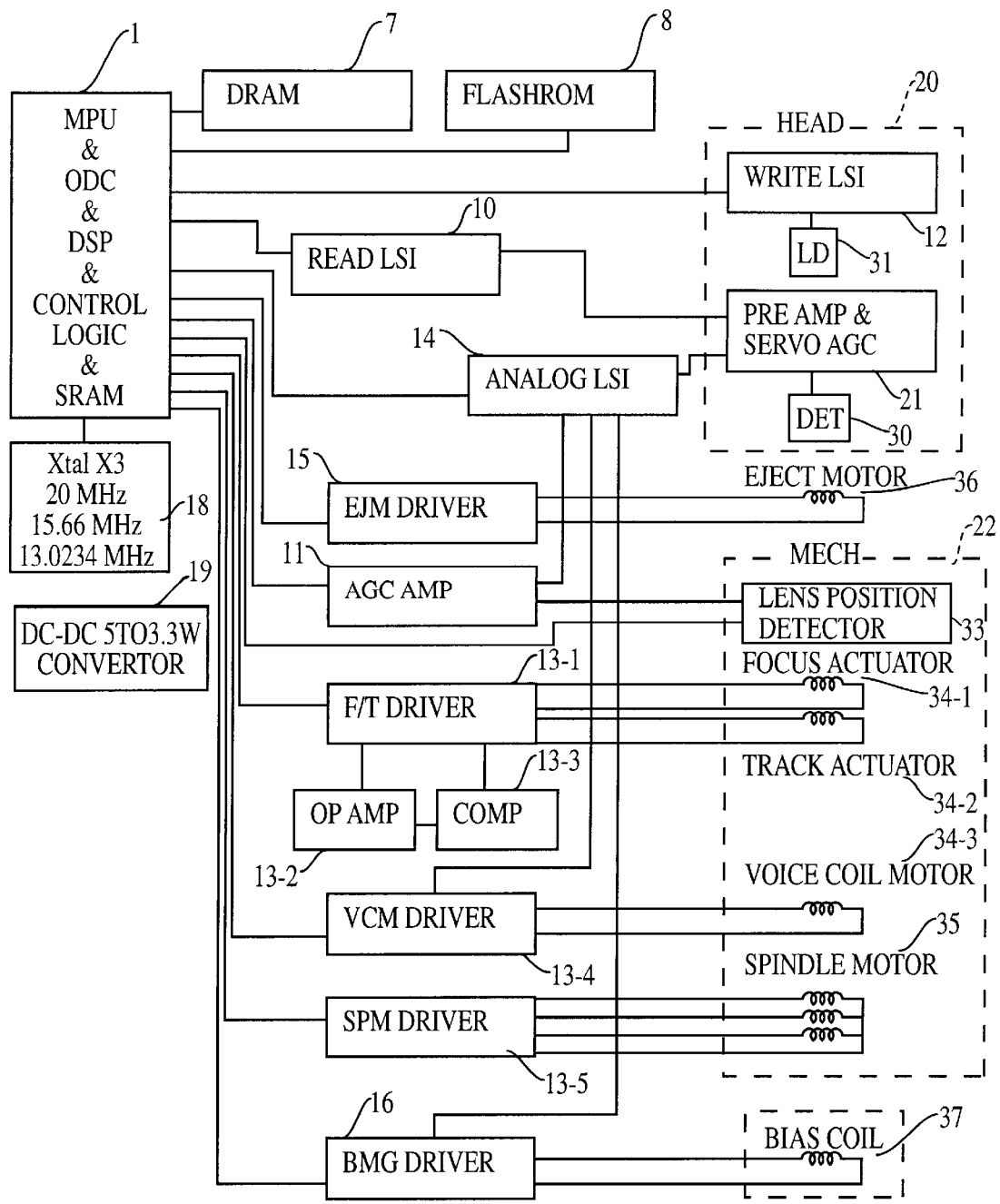
FIG. 2 is a circuit block diagram in one embodiment of the present invention.

FIG. 1 is a diagram showing a construction in one embodiment of the present invention. FIG. 2 is a circuit block diagram in one embodiment of the present invention.

FIG. 1 is a block diagram illustrating a control circuit of a magneto-optic disk apparatus. A microprocessor (MPU) 2 executes main control of the apparatus. A random access memory (RAM) 3 is a memory used for the MPU 2 executing an arithmetic process.

An optical disk controller (ODC) 4 performs interface control with a host apparatus, and encodes and decodes the data. A digital signal processor (DSP) 5 performs servo control of an optical head, etc. of an optical disk drive. A control logic circuit 6 consists of a group of logic circuits for generating a timing gate for transmitting and receiving the data between the MPU 2, the ODC 4, the DSP 5, the optical head and the drive mechanism.

The MPU 2, the RAM 3, the ODC 4, the DSP 5 and the control logic circuit 6 are connected to each other via an internal address/data bus 9. Then, the MPU 2, the RAM 3, the ODC 4, the DSP 5, the control logic circuit 6 and the internal address/data bus 9 are formed on one chip and thus constitute an LSI 1.

A read-only memory (ROM) 8 is a memory for storing a control program executed by the MPU 2. The ROM 8 is connected to the internal bus 9 of the LSI 1. A random access memory (RAM) 7 is a memory used as a buffer memory of read/write data. The RAM 7 is connected to the ODC 4 via an external address/data bus 9-1.

Analog circuits are provided in addition to this digital circuit. The analog circuits are a read circuit 10, a write circuit 12, a drive circuit 13 and a servo/AGC circuit 21.

The read circuit 10 amplifies an output of an optical detector 30 of the optical head and outputs the read data to the ODC 4. The write circuit 12 drives a laser diode 31 of the optical head in accordance with the write data given from the ODC 4. The data are thereby written to the optical disk.

The drive circuit 13 drives a drive mechanism 32 of the optical head in accordance with a servo signal transmitted from the DSP 5. The drive mechanism 32 of the optical head may include a focus actuator of the optical head, a track actuator of the optical head, and a moving motor of the optical head.

The servo/AGC circuit 21 creates a focus error signal and a track error signal from detection outputs of an optical detector 30 of the optical head. The focus error signal and the track error signal are outputted to the DSP 5.

Thus, the LSI 1 accommodates the MPU 2, the RAM 3, the ODC 4, the DSP 5, the control logic circuit 6, and the internal address/data bus 9. Therefore, a mounting area of these circuits is reduced enough to attain a remarkable downsizing of these circuits.

Further, the internal address/data bus 9 is extended within the LSI 1, and therefore a length of the address/data bus extending outside the LSI 1 can be reduced. This makes it feasible to decrease an occupied area of the address/data bus on the circuit board.

The digital circuits for inputting and outputting the digital signals are combined with the bus 9, whereby the external analog circuits can be prevented from being radiated noises. Hence, the servo control can be precisely carried out, and besides a read operation is stabilized.

Further, the DSP 5 including A/D and D/A converters is classified as a digital/analog mixed circuit. The DSP 5 is, however, connected to the bus, so that the DSP 5 also becomes integral. Consequently, the apparatus is more downsized. Besides, the radiation of noises can be reduced.

Herein, it is technically possible for the LSI 1 to accommodate the ROM 8 and the RAM 7. The RAM 7, however, performs a role of a data buffer, and therefore the external bus 9-1 for the connection to the ODC 4 is different from the internal address/data bus 9. Moreover, it is required that a demand for changing a buffer size be also taken into consideration. For this reason, the RAM 7 is not incorporated into the LSI 1.

Also, the ROM 8 stores the control program. Hence, it is more convenient to write the control program to the ROM 8 as a single unit. Further, it may happen that the control program is rewritten for version-up of the control program. In this case also, it is convenient that the control program can be rewritten to the ROM 8 as the signal unit. The ROM 8 is not therefore incorporated into the LSI 1.

As a matter of course, the ROM 8 and/or the RAM 7 can be incorporated into the LSI 1. This construction has a more possibility of downsizing the apparatus.

A more detailed description will be given with reference to a circuit block diagram of FIG. 2. As illustrated in FIG. 1, the MPU 2, the ODC 4, the DSP 5, the control logic circuit 6 and the SRAM 3 are formed on one chip. Then, a clock source unit (quartz oscillator) 18 having three clock sources is connected to one chip LSI 1. The clock source unit 18 includes a clock source for generating a system clock, a clock source for generating a reference clock for a medium type 1 (for 230MB/128MB medium), and a clock source for generating a reference clock for a medium type 2 (for 640MB/540MB medium).

The RAM 7 is constructed of a general-purpose bit DRAM. The ROM 8 is constructed of a general-purpose bit FLASHROM.

An optical head 20 is provided with a write LSI circuit 12, a pre-amplifier servo AGC circuit 21. The write LSI circuit 12 executes read/write light emitting control of a laser diode (light emitting element) 31. Then, the write LSI circuit 12 is connected to the control logic circuit 6 of the LSI 1, and performs the read/write light emitting control of the laser diode 31 in response to an indication of the MPU 2.

The pre-amplifier servo AGC circuit 21 converts a detection current of an optical detector 30 into a voltage, and thereafter generates a regenerative signal, a focus error signal and a track error signal. The pre-amplifier servo AGC circuit 21 is constructed of a circuit for generating the regenerative signal, a circuit for generating the focus error signal, and a circuit for generating the track error signal.

The read circuit (LSI)10 generates a waveform of the regenerative signal (read signal) of the preamplifier AGC circuit 21 and outputs pulsed read data to the ODC 4. The read LSI 10 is constructed of a waveform generating circuit.

An analog LSI circuit 14 is constructed by integrating a variety of analog circuits used within the apparatus. The analog LSI circuit 14 filters and amplifies the focus error signal and the track error signal.

An optical disk drive mechanism 22 is provided with a lens position detecting circuit 33 for detecting a lens position of the optical head 20. The AGC amplifier 11 is a circuit for effecting a current/voltage conversion of a sensor signal of the detecting circuit 33.

Further, the optical disk drive mechanism 22 is provided with a focus actuator 34-1, a track actuator 34-2 and a voice coil motor 34-3 as drive mechanisms of the optical head 20.

The focus actuator 34-1 drives the lens of the optical head 20 in a focusing direction, thus controlling a focus position of light beams. The track actuator 34-2 drives the lens of the optical head 20 in a track traversing direction, thus controlling a track position of the light beams. The voice coil motor 34-3 moves the optical head 20 in the track traversing direction on the optical disk.

The DSP 5 executes a variety of servo control processes in accordance with the focus/track error signals from the analog LSI circuit 14 and the lens position detecting signal from the AGC amplifier 11. That is to say, the DSP 5 carries out focus servo control, track servo control and seek control as well.

The DSP 5 has an A/D converter unit for effecting analog/digital conversions of the focus error signal, the track error signal and the lens position detecting signal. Then, the DSP 5 calculates servo control values (a focus servo control value, a track servo control value and a seek servo control value) on the basis of these A/D converted signals.

The DSP 5 has a D/A converter unit for converting these servo control values into analog servo control quantities. The DSP 5 outputs the control quantities to drive circuits 13-1, 13-4 for the servo control.

The drive circuit 13-1 is a focus/track driver circuit 13-1 for driving a focus actuator 34-1 and a track actuator 34-2. The focus/track driver circuit 13-1 is constructed of known circuits. More specifically, the focus/track driver circuit 13-1 is constructed of 2-channel H-type bridge circuits IC.

Connected to the focus/track driver circuit 13-1 are an operational amplifier 13-2 for detecting a drive current and a comparator 13-3 for setting a drive current value.

Further, the drive circuit 13-4 is a VCM driver circuit 13-4 for driving a voice coil motor 34-3. The VCM driver circuit 13-4 is constructed of a general-purpose full bridge circuit.

Furthermore, the mechanism 22 is provided with an eject motor 36 for ejecting an optical disk cartridge outside and a spindle motor 35 for rotating the optical disk.

The eject driver circuit 15 is connected to the control logic circuit 6 and drives the eject motor 36 in accordance with an indication of the MPU 2.

The spindle driver circuit 13-5 is connected to the control logic circuit 6 and drives the spindle motor 35 in accordance with the indication of the MPU 2. The spindle motor circuit 13-5 is constructed of a 3-phase sensorless motor driver.

Provided further is a bias coil 37 for applying a magnetic field across the optical disk. The bias driver circuit 16 is connected to the control logic circuit 6 and drives the bias coil 37 in accordance with an indication of the MPU 2. The bias driver circuit 16 is constructed of an H-type bridge circuit.

A DC-DC converter 19 converts a voltage of 5 V into 3.3 V and thus supplies the electric power.

After converting the focus/track error signals of the analog LSI circuit 14 into the digital signals, this control circuit, as already known, operates to carry out the focus servo control and the track servo control in response to these digital signals. That is to say, the DSP 5 outputs the control quantity to the focus/track drive circuit 13-1, thereby driving the focus actuator 34-1 and the track actuator 34-2.

An outside computer issues a read/write command to the MPU 2 via the ODC 4. The MPU 2 indicates a moving distance to the DSP 5 in order to locate the optical head in a designated track position on the optical disk. The DSP 5 drives the voice coil motor 34-3 through the VCM driver circuit 13-4. The DSP 5 drives the voice coil motor 34-3 while detecting a position of the optical head from the track error signal of the analog LSI circuit 14, thus locating the optical head at the designated track.

The write data received by the ODC 4 is, after being stored in the DRAM 7, outputted to a write LSI 12, and the laser diode 31 is driven. With this operation, the data are written onto the optical disk.

Further, when receiving a read command, the pre-amplifier servo AGC circuit 21 generates regenerative signals from the detection signals of the optical detector 30 of the optical head 20. The regenerative signals are converted into pulses by the read circuit 10, thereby obtaining read data. The read data are outputted to the ODC 4 from a read LSI 10 and are thereafter stored in the DRAM 7. The read data stored in the DRAM 7 are outputted to the outside from the ODC 4.

Figure 3:
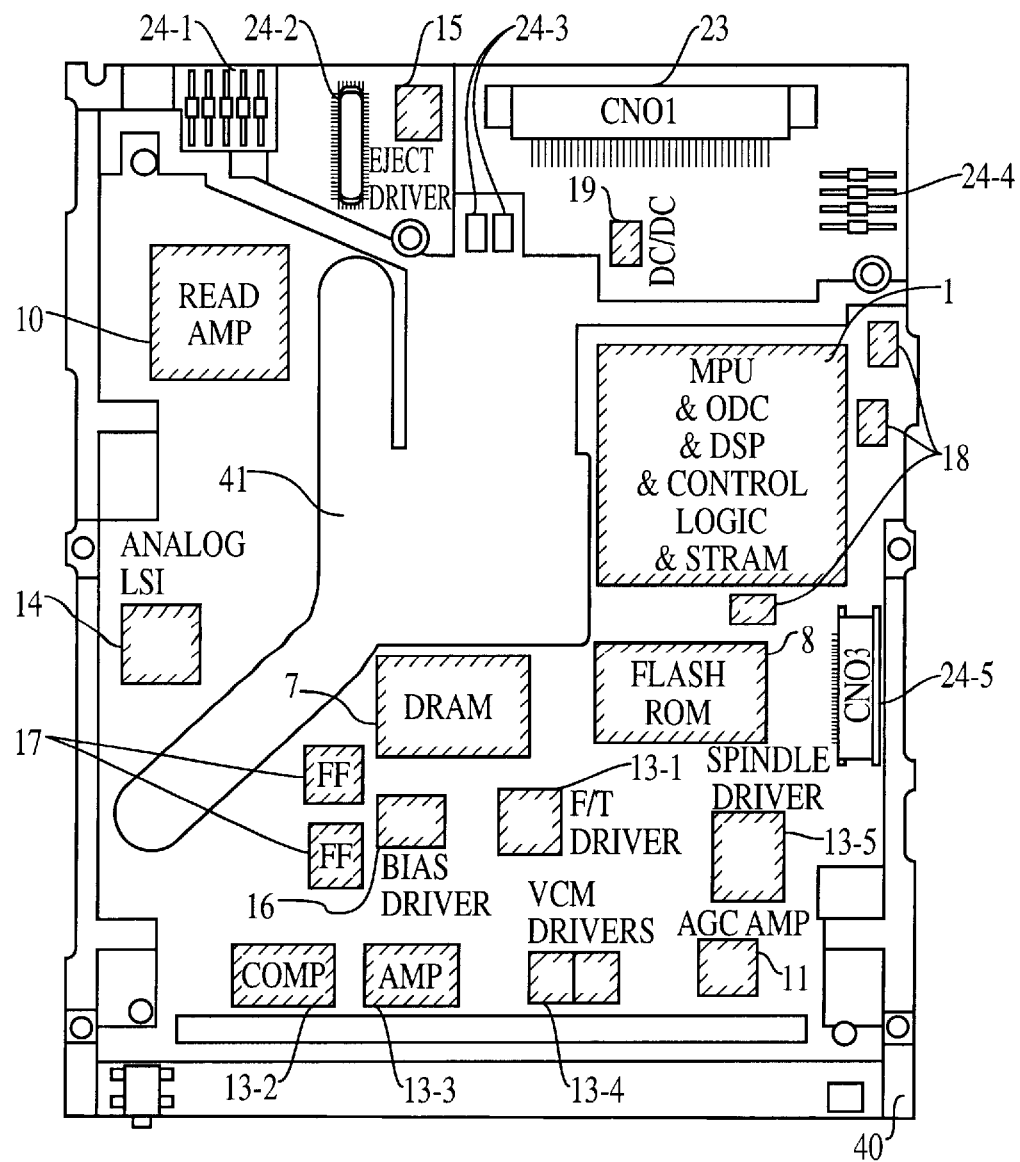
FIG. 3 is a diagram showing a circuit construction in one embodiment of the present invention.
Figure 4:
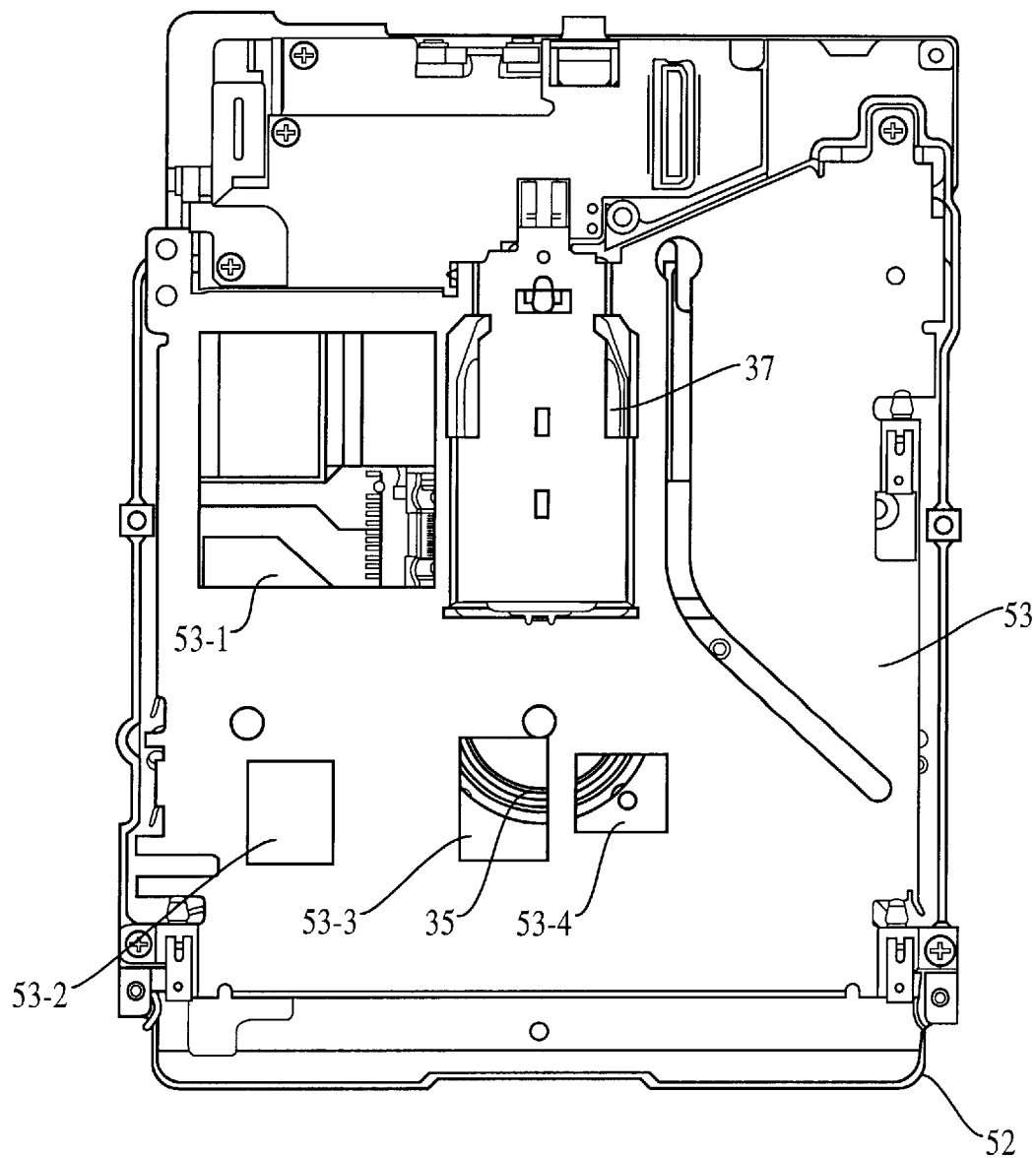
FIG. 4 is a diagram showing a drive mechanism as viewed from above in one embodiment of the present invention.
Figure 5:
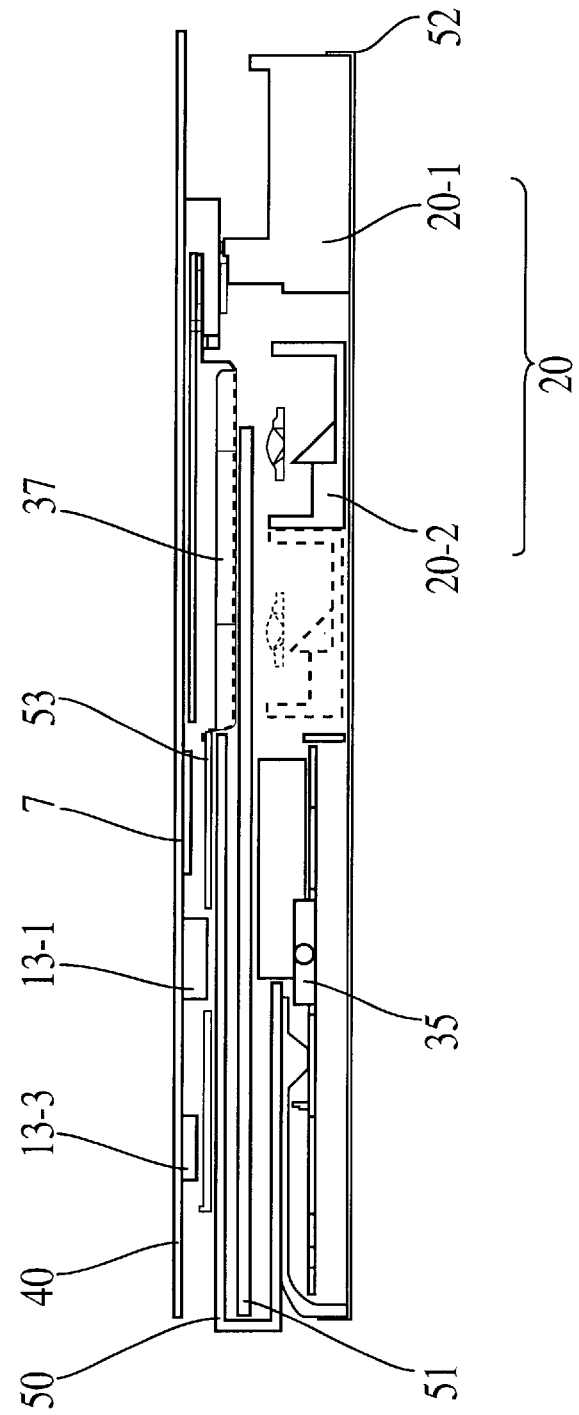
FIG. 5 is an sectional view illustrating a apparatus in one embodiment of the present invention.
Figure 6:
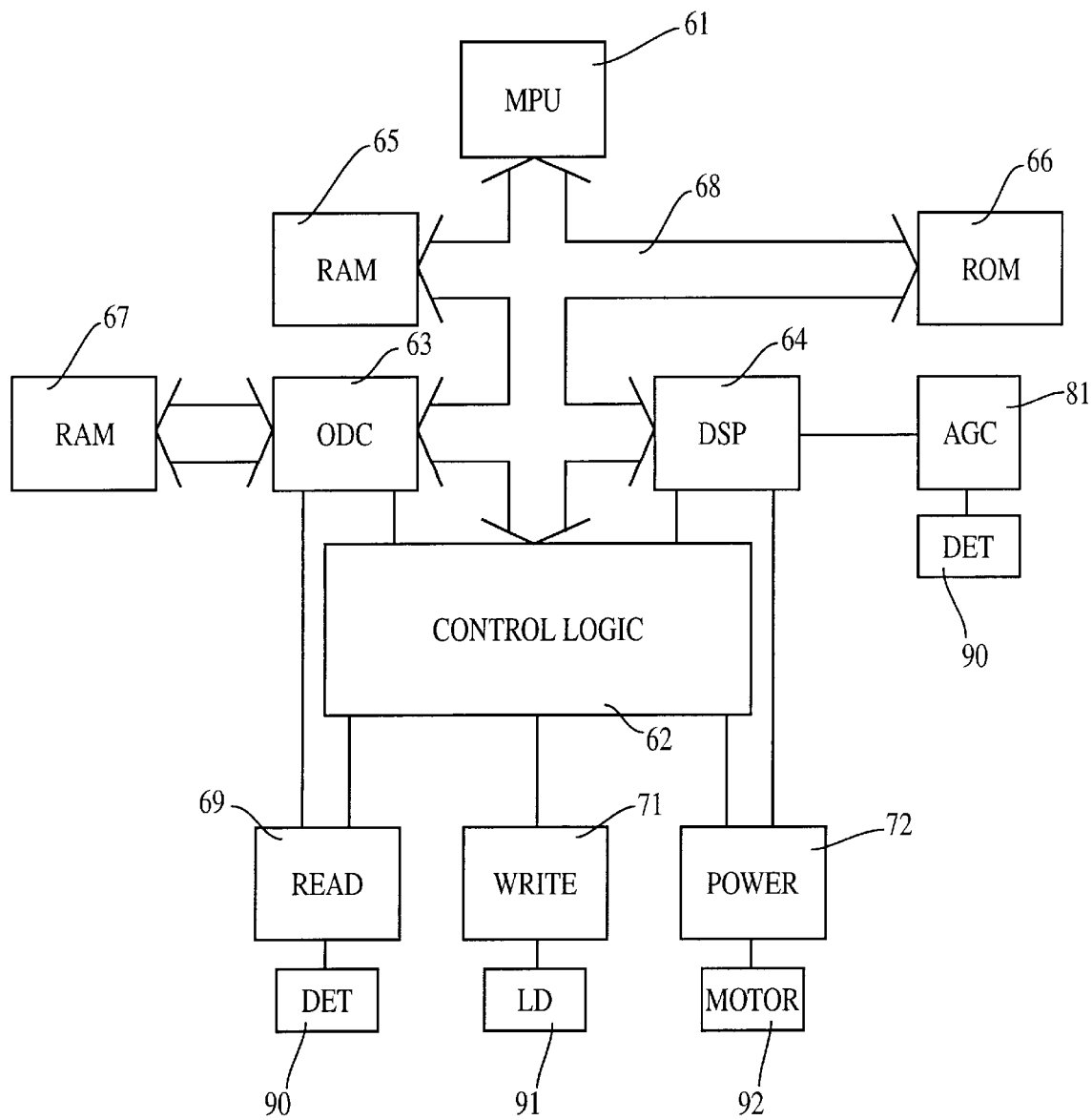
FIG. 6 is a diagram showing a construction in the prior art.
Figure 7:
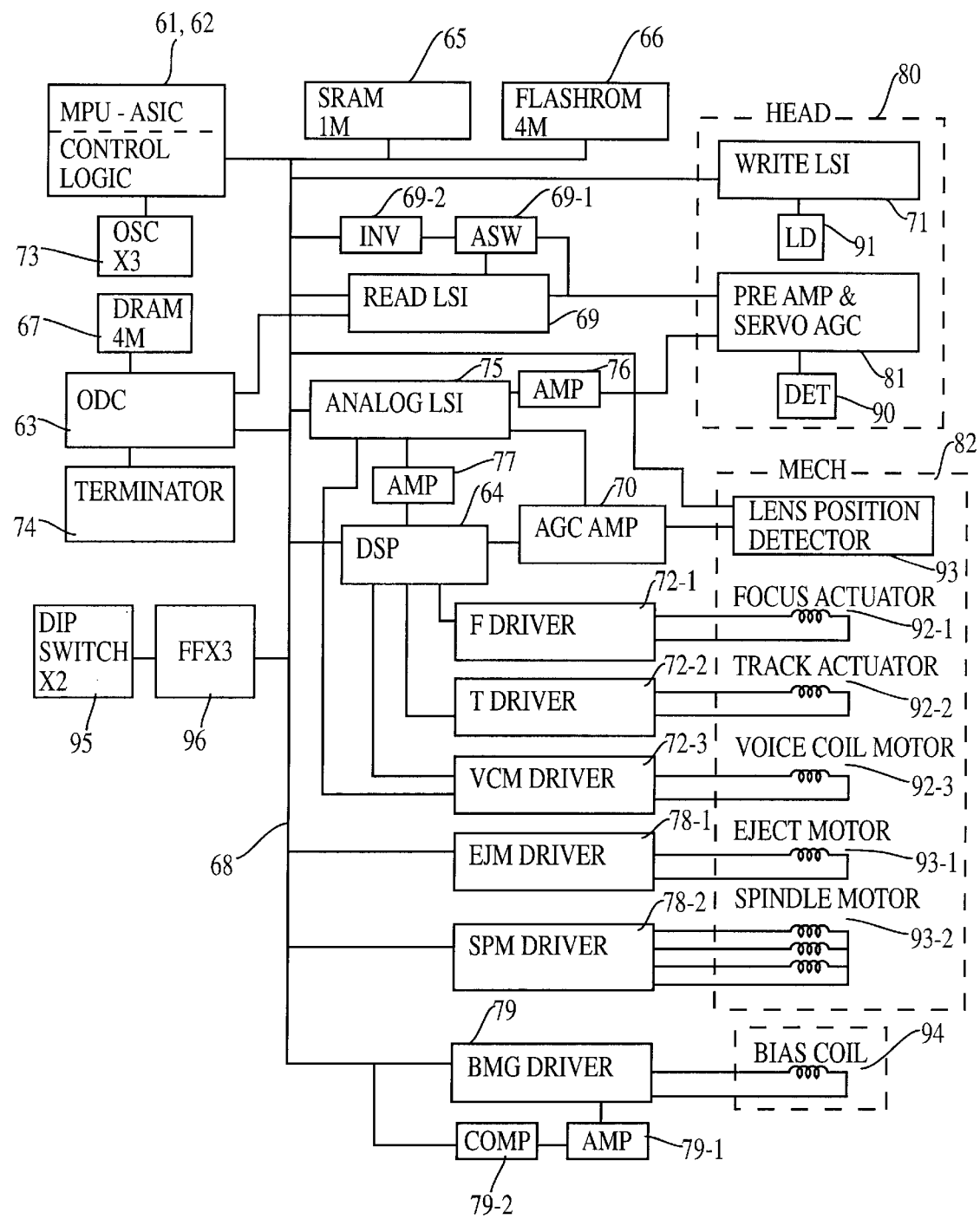
FIG. 7 is a circuit block diagram in the prior art.

FIG. 3 is a view showing circuit construction in one embodiment of the present invention. FIG. 4 is a top view of the drive. FIG. 5 is a sectional view illustrating the magneto-optic disk apparatus.

FIG. 3 shows a mounting surface of a circuit board 40 on the side of the optical disk drive. As illustrated in FIG. 3, an area 41 incapable of mounting the parts is formed at the central portion of the circuit board 40. As shown in FIG. 4, a bias coil 37 is provided in a position of this area, to which the optical disk drive mechanism corresponds. Therefore, the parts can not be mounted at the center of the circuit board 40.

The address/data bus is arranged in the area 41 of the circuit board 40. The LSI circuit 1, the ROM 8, the RAM 7, the analog LSI circuit 14 and the read LSI circuit 10 are so provided as to surround the area 41. The driver circuits 13-1, 13-4, 13-5, 16 are provided thereunder.

The opposite surface of the circuit board 40 is mounted with no parts. Note that the numeral 23 represents an IDE (Intelligent drive electronics) interface connector, and 24-1 to 24-5 denote connectors for connections to the optical disk drive. Further, a flip-flop circuit 17 is an external address drive flip-flop.

As shown in FIG. 5, an optical disk drive mechanism 52 has the spindle motor 35 and the optical head 20. The spindle motor 35 rotates an optical disk 51 within a cartridge case 50.

The optical head 20 has a fixed portion 20-1 and a movable portion 20-2. The fixed portion 20-1 is provided with the laser diode 31, the optical detector 30, the write LSI circuit 12, and the pre-amplifier AGC circuit 21, which are fixed to a apparatus base.

The movable portion 20-2 is moved by the voice coil motor 34-3 in the track traversing direction on the optical disk 51. The movable portion 20-2 is provided with the lens focus actuator 34-1, the track actuator 34-2 and the lens position detector 33.

A cartridge holder 53 is attached onto the fixed portion 20-1. The cartridge holder 53 holds the cartridge case 50 to be inserted. The cartridge holder 53 has an upper surface and two side surfaces. The bias magnetic field applying coil 37 is provided at the center on the upper surface of the cartridge holder 53.

As illustrated in FIG. 5, the upper surface of the circuit board 40 is mounted with no parts. All the parts are mounted on the lower surface of the circuit board 40. Then, the circuit board 40 is attached to the optical disk drive 52 so that the lower surface of the board 40 is set in a face-to-face relationship with the optical disk drive 52.

Herein, the LSI circuit 1, the driver circuits 13-5, 13-1, 16, which are mounted on the circuit board 40, are comparatively high-elevated. Therefore, if the circuit board 40 is closely fitted to the cartridge holder 53 of the optical disk drive 52, there might be no allowance between the cartridge holder 53 and a set of the LSI circuit 1 and the DRIVE circuits 13-5, 13-1, 16. Then, the comparatively high-elevated circuits 1, 13-5, 13-1, 16 have a possibility of their being brought into contact with the upper surface of the cartridge holder 53.

For preventing this, as shown in FIG. 4, the upper surface of the cartridge holder 53 is formed with holes 53-1 to 53-4 through which the parts are inserted. Then, when the circuit board 40 is attached to the optical disk drive 52, the comparatively high-elevated LSI circuit 1, driver circuits 13-5, 13-1, 16 respectively face to the holes 53-1 to 53-4.

Namely, a thick portion of the upper surface of the cartridge holder 53 of the optical disk drive 52 is utilized as a space for accommodating the comparatively high-elevated parts.

As described above, the upper surface of the circuit board 40 is mounted with no parts, and the circuit board mounted with the parts is closely fitted to the optical disk drive mechanism 52. Hence, the thickness of the optical disk apparatus including the circuit board 40 can be made much smaller. Accordingly, an optical disk apparatus as thin as approximately 17 mm can be actualized.

Thus, only a single surface of the circuit board 40 attached to the optical disk drive mechanism 52 is mounted with the parts, and therefore the thickness of the optical disk apparatus can be decreased.

Further, the address/data bus, the MPU 2, the RAM 3, the ODC 4, the DSP 5 and the control logic circuit 6 that are all connected thereto, are provided on one chip and are thus packaged within the single piece of LSI. Therefore, these circuits can be reduced. Moreover, a length of the address/data bus on the circuit board can be minimized. This makes it feasible to downsize the circuit board 40 and package only the one-sided surface of the circuit board 40 with the parts.

With this construction, the thickness of the optical disk apparatus can be decreased. Further, parts are only the single-sided surface, and hence manufacturing costs can be reduced. Further, since the digital circuit is united, the length of the address/data bus on the circuit board 40 can be minimized. It is therefore possible to reduce the noise radiation to the analog circuits mounted on the circuit board.

Note that the optical disk apparatus has been explained so far by way of the magneto-optic disk apparatus capable of reading and writing processes, however, the present invention is applicable to other optical disk apparatuss capable of only a reading process.

The present invention has been discussed so far by way of the embodiments. A variety of modifications may be, however, possible within the range of the gist of the present invention, and are not excluded from the scope of the present invention.

As discussed above, according to the present invention, first, all of the parts are mounted only on a one-sided surface of the circuit board, and hence the thickness of the circuit board mounted with the parts can be reduced. It is therefore feasible to reduce the thickness of the optical disk apparatus including the optical disk drive mechanism mounted with this circuit board.

Second, the one-chip LSI accommodates the circuits connected to the address/data bus as much as possible, and the address/data bus is extended into the LSI. With this construction, the length of the address/data bus on the circuit board decreases, and a degree of freedom of the packaging of the parts increases. Therefore, all of the parts can be mounted on only the one-sided surface of the circuit board.

Third, the variety of digital circuits can be packaged within the single LSI, and consequently the mounting area of these circuits is also reduced. It is therefore possible to easily mount on only a one-sided surface of the circuit board with the parts.

Fourth, since the digital circuits causing the noises are so arranged as to get integral by use of the bus, the analog circuits on the circuit board can be prevented from the radiated noises. Therefore, the analog signals steer clear of the influence of the noises, whereby the servo control and the data reading operation can be precisely carried out.

Fifth, as all of the parts are mounted on only the one-sided surface of the circuit board, the labor for mounting the parts is reduced. Besides, soldering to only the one-sided surface may be sufficient, and hence the manufacturing costs can be remarkably decreased.

What is claimed is:

1. An optical disk apparatus comprising:
   an optical disk drive mechanism having rotating means for rotating an optical disk, and an optical head for reading data on said optical disk by irradiating said optical disk with a light beam;
   an analog circuit for processing signals of said optical head;
   a digital circuit for controlling said analog circuit; and
   a circuit board mounted on said optical disk drive mechanism, said circuit board having a first surface facing toward said optical disk drive mechanism and a second surface facing opposite said first surface, wherein said analog circuit and said digital circuit are mounted upon said first surface and said second surface has no circuits mounted thereon;
   said analog circuit including:
      a drive circuit for driving said optical head; and
      a read circuit for creating read data from detection signals of said optical head,
   said digital circuit including:
      a one-chip LSI circuit having a processor for executing main control, a memory connected to an internal bus and used for processing of said processor, a logic circuit for creating a timing gate for transmitting and receiving the data to and from said optical head, and a controller, connected to said internal bus, for performing interface control with a host apparatus.

2. The optical disk apparatus according to claim 1, wherein said one-chip LSI circuit includes a digital signal processor, connected to said internal bus, for controlling said drive circuit in accordance with the detection signals of said optical head.

3. The optical disk apparatus according to claim 1, wherein said digital circuit further includes a ROM for storing a program executed by said processor, and a second memory for storing the data read.

4. The optical disk apparatus according to claim 2, wherein said drive circuit includes:
   a first drive circuit, connected to said digital signal processor, for driving a focus actuator for locating the light beam in a focus direction, and a track actuator for locating the light beam in a track traversing direction; and
   a second drive circuit, connected to said digital signal processor, for driving a moving mechanism for moving said optical head with respect to said optical disk.

5. The optical disk apparatus according to claim 4, wherein said analog circuit is connected to said digital signal processor, and includes an analog LSI circuit for analogically processing the detection signals of said optical head.

6. The optical disk apparatus according to claim 1, wherein said optical disk drive mechanism has an opposing surface that opposes said first surface of said circuit board, and wherein said opposing surface of said optical disk drive mechanism is formed with at least one hole for accommodating at least one of said analog circuit and said digital circuit.

7. The optical disk apparatus according to claim 1, wherein said optical disk drive mechanism has a cartridge holder for holding said optical cartridge having said optical disk, and an upper surface of said cartridge holder is mounted to said circuit board.

8. The optical disk apparatus according to claim 7, wherein said upper surface of said cartridge holder has at least on hole for accommodating at least one of said analog circuit and said digital circuit.

9. The optical disk apparatus according to claim 8, further comprising:
   a magnetic field applying coil, provided on said upper surface of said cartridge holder, for applying a magnetic field across said optical disk,
   wherein said at least one hole is formed in a portion excluding the portion provided with said magnetic field applying coil on said upper surface of said cartridge holder.

10. The optical disk apparatus according to claim 9, wherein said analog circuit and said digital circuit are mounted in such positions as not to face said magnetic field applying coil of said optical disk drive of said circuit board.

11. The optical disk apparatus according to claim 1, wherein said logic circuit is connected to said internal bus.

12. An optical disk apparatus comprising:
   an optical disk drive mechanism having rotating means for rotating an optical disk, and an optical head for reading data on said optical disk by irradiating said optical disk with a light beam;
   an analog circuit for processing signals of said optical head;
   a digital circuit for controlling said analog circuit; and
   a circuit board mounted on said optical disk drive mechanism, said circuit board having a first surface and a second surface facing opposite said first surface, wherein said analog circuit and said digital circuit are mounted upon said first surface and said second surface has no circuits mounted thereon;
   wherein said analog circuit including:
      a drive circuit for driving said optical head; and
      a read circuit for creating read data from detection signals of said optical head.

13. The optical disk apparatus according to claim 12, wherein said first surface of said circuit board faces the optical disk drive mechanism.

14. The optical disk apparatus according to claim 12, wherein said digital circuit including:

a one-chip LSI circuit having a processor for executing main control, a memory connected to a bus and used for processing of said processor, a logic circuit for creating a timing gate for transmitting and receiving the data to and from said optical head, and a controller, connected to said bus for performing interface control with a host apparatus.

15. The optical disk apparatus according to claim 13, wherein said optical disk drive mechanism has an opposing surface that opposes said first surface of said circuit board, and wherein said opposing surface of said optical disk drive mechanism is formed with at least one hole for accommodating at least one of said analog circuit and said digital circuit.

* * * * *

UNITED STATES PATENT AND TRADEMARK OFFICE
CERTIFICATE OF CORRECTION

PATENT NO. : 5,881,030  
DATED : March 9, 1999  
INVENTOR(S) : Masaaki Iwasaki

Page 1 of 3

Figure 8:
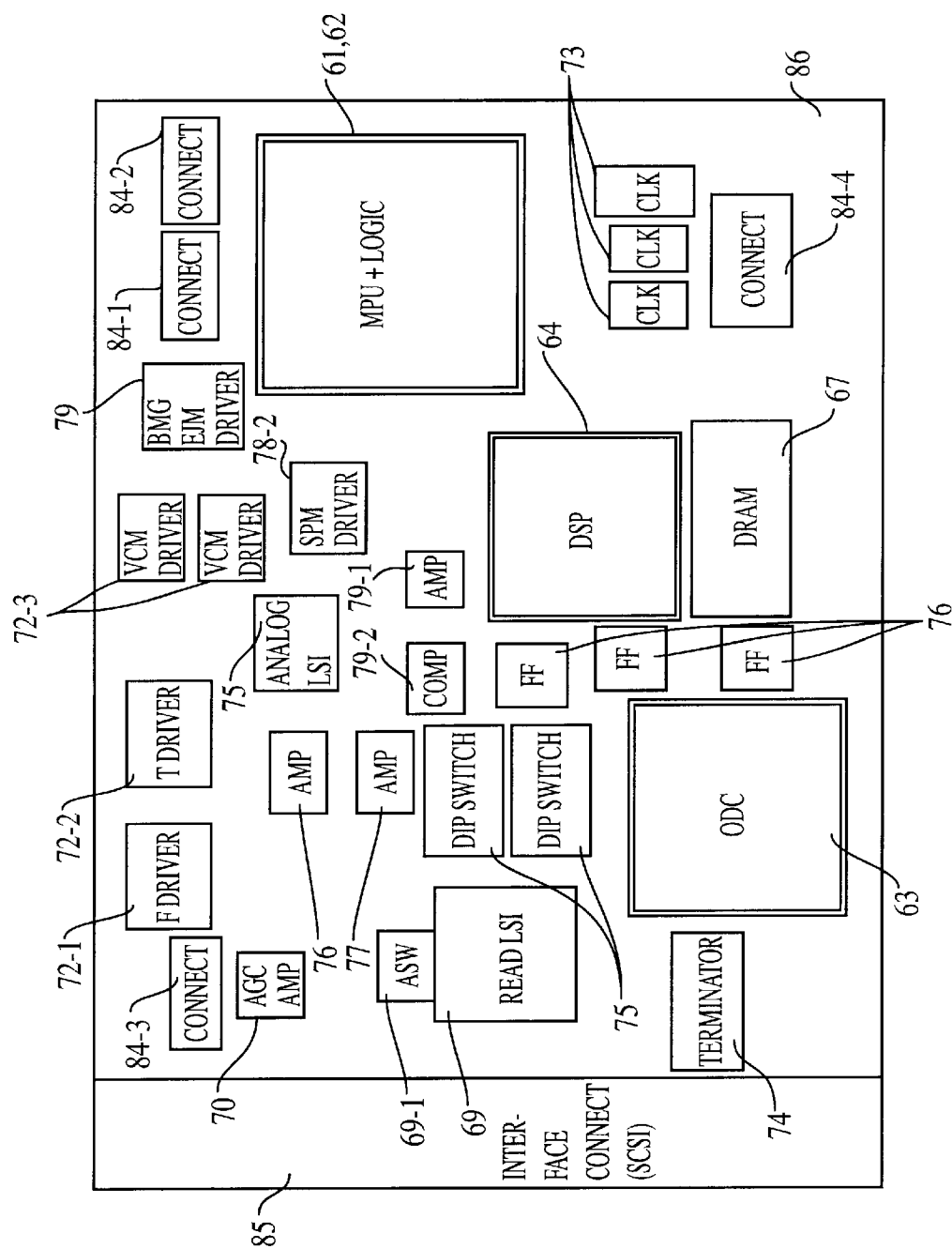
FIG. 8 is a mounting diagram (part 1) in the prior art.
Figure 9:
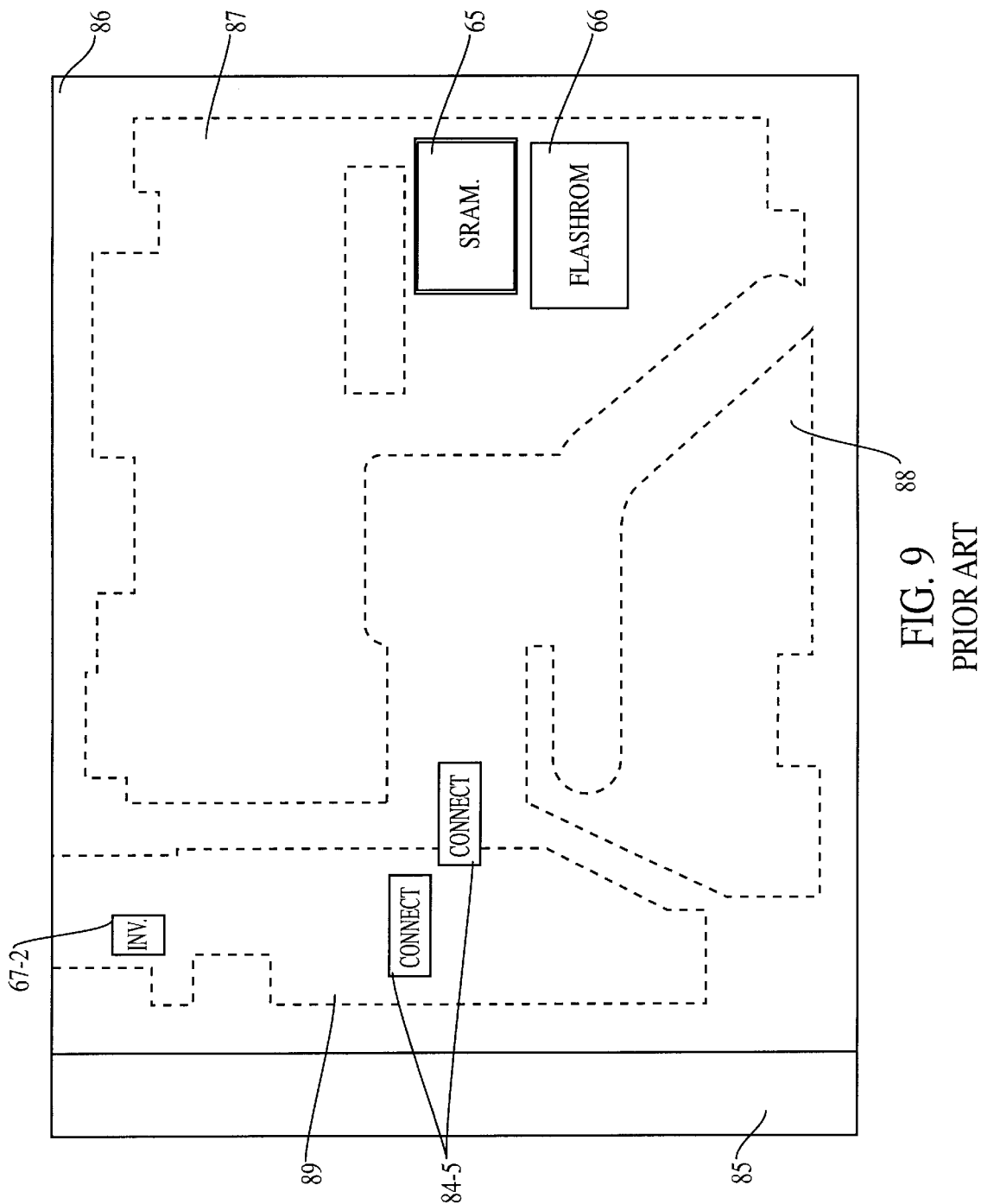
FIG. 9 is a mounting diagram (part 2) in the prior art.
Figure 10:
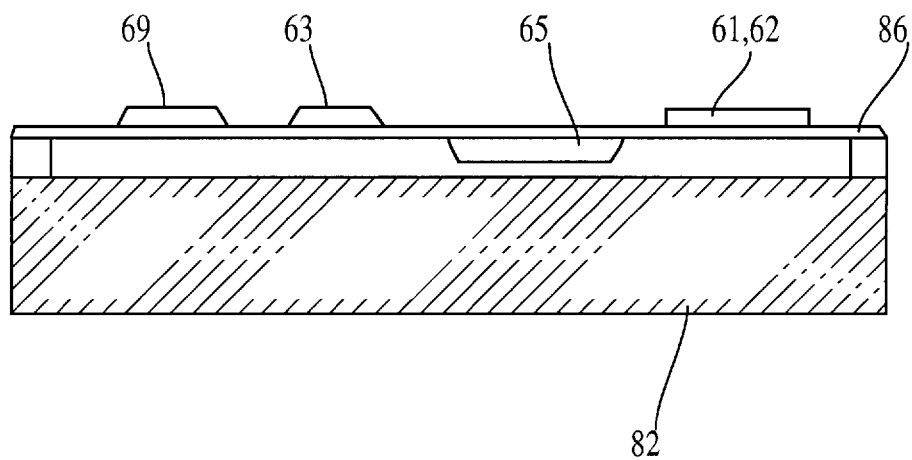
FIG. 10 is an explanatory diagram showing the prior art.

It is certified that error appears in the above-identified patent and that said Letters Patent is hereby corrected as shown below:

In the Drawing:

In the Figures:

Figure 8 on Sheet 8 of 10, change Dip Switch labeled "75" to --95--

Figure 8 on Sheet 8 of 10, change Flip-Flop labeled "76" to --96--

Column 12, line 28, delete "on hole" and insert --one hole-- therefor

Column 4, line 26, delete "mounting" and insert --mounted-- therefor

UNITED STATES PATENT AND TRADEMARK OFFICE
CERTIFICATE OF CORRECTION

PATENT NO. : 5,881,030
DATED : March 9, 1999
INVENTOR(S) : Masaaki Iwasaki

It is certified that error appears in the above-identified patent and that said Letters Patent is hereby corrected as shown below:

Column 4, line 26, delete "and parts," and insert

--parts,-- therefor

Column 5, line 66, delete "a apparatus" and insert --an apparatus-- therefor

Column 9, line 55, delete "a apparatus" and insert --an apparatus-- therefor

Column 10, line 58, delete "apparatuss" and insert --apparatuses-- therefor

Column 3, line 25, delete "75" and insert --95-- therefor

UNITED STATES PATENT AND TRADEMARK OFFICE
CERTIFICATE OF CORRECTION

PATENT NO. : 5,881,030
DATED : March 9, 1999
INVENTOR(S) : Masaaki Iwasaki

It is certified that error appears in the above-identified patent and that said Letters Patent is hereby corrected as shown below:

Column 3, line 26, delete "76" and insert --96-- therefor

Column 3, line 26, delete "75" and insert --95-- therefor

Column 3, line 27, delete "75" and insert --95-- therefor

Column 3, line 27, delete "76" and insert --96-- therefor

Signed and Sealed this

Twenty-sixth Day of September, 2000

Attest:

Q. TODD DICKINSON

Attesting Officer     Director of Patents and Trademarks